United States Patent [19]

Sodhi

[11] Patent Number: 5,757,166
[45] Date of Patent: May 26, 1998

[54] POWER FACTOR CORRECTION CONTROLLED BOOST CONVERTER WITH AN IMPROVED ZERO CURRENT DETECTION CIRCUIT FOR OPERATION UNDER HIGH INPUT VOLTAGE CONDITIONS

[75] Inventor: Sameer Sodhi, Palatine, Ill.

[73] Assignee: Motorola, Inc., Schaumburg, Ill.

[21] Appl. No.: 565,268

[22] Filed: Nov. 30, 1995

[51] Int. Cl.$^6$ .................................................. G05F 1/10
[52] U.S. Cl. ........................... 323/222; 363/89; 363/124
[58] Field of Search ................................ 323/222, 223, 323/285, 207; 363/16, 21, 78, 89, 124

[56] References Cited

U.S. PATENT DOCUMENTS

| | | | |
|---|---|---|---|
| 4,163,278 | 7/1979 | Onoue et al. | 363/101 |
| 5,019,952 | 5/1991 | Smolenski | 363/16 |
| 5,144,204 | 9/1992 | Nerone et al. | 315/209 R |

*Primary Examiner*—Peter S. Wong
*Assistant Examiner*—Rajnikant B. Patel
*Attorney, Agent, or Firm*—Gary J. Cunningham

[57] ABSTRACT

An electronic power supply circuit (12) having a rectifier circuit (18) adapted to receive a source of alternating current (10), a power factor correction driven boost converter (20), and a bulk capacitance (22). The boost converter (20) includes a boost transformer (24) having a primary winding (32) and a secondary winding (34), a boost switch (26), a boost diode (28), a zener diode (46), and a power factor correction control circuit (30) having a zero current detect input (58). The presence of the zener diode (46) effectively adds a fixed offset to the voltage provided to the zero current detect input (58), thereby allowing the boost converter (20) to operate under high input line voltage conditions. The zener diode (46) may be oriented in various ways, and may be incorporated into an integrated circuit containing other elements of the power factor correction control circuit (30). One particular embodiment of the power supply circuit (12) is for use in an electronic ballast (70) for fluorescent lamps.

19 Claims, 2 Drawing Sheets

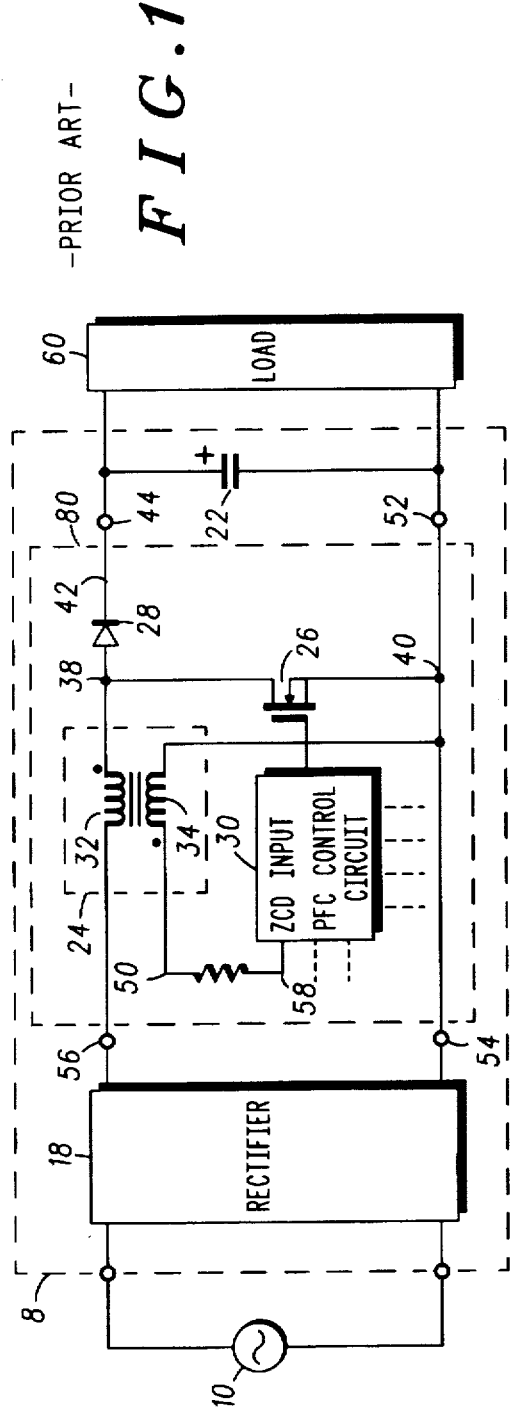
FIG.1 -PRIOR ART-
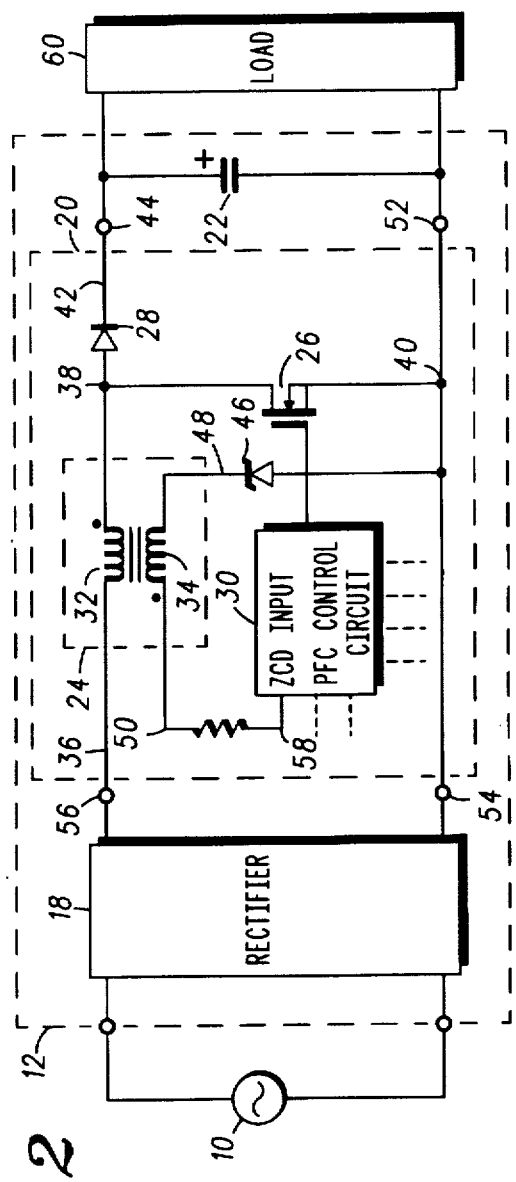
FIG.2

POWER FACTOR CORRECTION CONTROLLED BOOST CONVERTER WITH AN IMPROVED ZERO CURRENT DETECTION CIRCUIT FOR OPERATION UNDER HIGH INPUT VOLTAGE CONDITIONS

FIELD OF THE INVENTION

The present invention relates to the general subject of electronic power supplies and, in particular, to a boost converter having a power factor correction (PFC) control circuit with an improved zero-current detection (ZCD) circuit which allows the converter to operate under high input line voltage conditions.

BACKGROUND OF THE INVENTION

High frequency boost converters are used in many electronic power supplies because of their effectiveness in providing, among other benefits, power factor correction of the input line current. High frequency boost converters can generally be classified into two types according to the control method used to commutate the boost switch—pulse-width modulator (PWM) driven and power factor correction (PFC) driven. The basic operation and implementation of a PFC driven boost converter is explained in several product application notes, such as those for the MC33262 power factor correction integrated circuit manufactured by Motorola, Inc.

Use of a PFC control circuit in boost converters offers several advantages over use of a PWM control circuit. The first advantage is superior power factor and total harmonic distortion in the input current drawn from the AC source. A second advantage, which is due to the higher average frequency of operation of a PFC driven converter, is reduction in the required physical size of the boost transformer. The third advantage is reduced switching losses in the boost switch and boost rectifier, and is attributable to "critical conduction mode" operation in which the boost switch is turned on only after the current in the primary winding of the boost transformer has fallen close to zero, so that the boost switch is switched on, and the boost diode becomes reverse biased, under low forward current conditions.

In many applications, it is desirable to have a boost converter in which the boost output voltage is as low as possible without sacrificing desirable operational characteristics such as exceptional power factor and low harmonic distortion in the input current. This is particularly so in electronic ballast applications in which an inverter is coupled to the output of the boost converter. The inverter typically contains one or more power switches, and the voltage stress experienced by these switches is proportional to the boost output voltage. As the monetary cost of power switches increases with their voltage ratings, low component cost of the inverter is often highly dependent upon successfully operating with a low boost output voltage.

In addition, many power supplies and ballasts are expected to continue to operate reliably during extended periods of time in which the AC line voltage appreciably exceeds its nominal value. Typically, a power supply or ballast must be designed to continue to operate normally at line voltages as high as 10% above the nominal line voltage, which condition will hereafter be referred to as "high line" operation. For example, a ballast rated for 277 volt operation must be designed to operate reliably at AC line voltages as high as 305 volts.

It should be appreciated that boost converter operation is implicitly dependent upon the condition that the boost output voltage always exceed the peak of the input voltage. This condition places a theoretical lower limit on how low a boost output voltage one can operate with for a specified input voltage range. For example, if the converter must be able to operate normally for a sinusoidal input voltage as high as 305 V (rms), then the theoretical minimum boost voltage is 305*1.414=431 V. In actual boost converters, additional margin must be added in order to account for other practical constraints, such as maintaining a switching frequency in excess of 20,000 Hertz in order to prevent the occurrence of audible noise. Therefore, the boost output voltage should exceed the maximum peak input voltage by a certain percentage, typically in the range of about 15%, which in the aforementioned example amounts to a minimum recommended boost voltage of 496 V.

The design strategy of minimizing inverter cost by operating with a lower boost output voltage may lead to stability problems under high line voltage conditions for a PFC driven boost converter.

Referring to FIG. 1, a prior art power supply circuit 8 is shown. The circuit 8 is adapted to receive power 10, and includes a rectifier circuit 18, a boost converter 80 and a load 60 comprising an inverter and fluorescent lamp. The boost output voltage is defined as the voltage present between boost output terminals 44,52. When the difference between the boost ouput voltage and the peak of the input voltage becomes too small, the boost converter 80 ceases to function properly due to a falsely perceived zero current condition which arises because of insufficient voltage across the primary 32 of the boost transformer 24 when the boost switch 26 is in the off state. When the boost switch 26 is in the off state, the voltage across the primary winding of the boost transformer is, neglecting the small forward voltage drop across the boost diode 28, equal to the difference between the boost converter output voltage and the instantaneous value of the rectified AC line voltage. The PFC control circuit 30 turns the boost switch 26 on only if the voltage applied to the zero current detect (ZCD) input 58 drops below a certain threshold voltage, hereinafter referred to as the ZCD threshold. For standard power factor correction controllers, such as the MC33262 integrated circuit manufactured by Motorola, Inc., the ZCD threshold is typically in the range of one to two volts.

Under high line operation, during periods in which the line voltage is at or near its peak value, the difference between the input voltage and the boost output voltage may be so small that the voltage across the boost secondary 34 falls below the ZCD threshold. Consequently, the PFC control circuit 30 switches the boost switch 26 on, even though the current flowing through the boost primary 32 has not necessarily dropped to near zero. Subsequently, with the boost switch 26 on again, the current flowing through the boost primary 32 continues to rise. However, a current limiting function of the PFC control circuit 30 promptly forces the boost switch 26 off again. The cycle repeats itself, with the ZCD and current limiting functions "fighting" each other—the ZCD function turns the boost switch 26 on, but the current limiting function turns the boost switch 26 off. So, the boost switch 26 is turned on and off in a very rapid fashion, causing drastic fluctuations in the boost output voltage and in the current drawn from the AC line. As one of the principal requirements of a boost converter is that it provide a consistent and stable output voltage, this type of false zero current detection causes the boost converter to operate in a highly undesirable mode.

Approaches which may be used to address the problem of false zero current detection in a PFC driven boost converter under high line conditions include the following:

Redesign the boost converter to operate at a higher boost output voltage.

Increase the number of turns on the secondary winding of the boost transformer.

Use dedicated zero current detect and bootstrap windings (i.e., two separate secondaries on boost transformer).

The first approach is the most direct and eliminates the root cause of the false zero current detection problem, but at the potentially prohibitive price of redesigning the load or inverter such that a higher boost output voltage can be tolerated. The second approach requires no additional components, but is not very practical since, in most applications, the boost secondary winding also serves as a bootstrap winding for providing the DC supply voltage required for operation of the driver circuit; increasing the number of turns on the boost secondary in such a case produces higher power dissipation in the driver circuit and may, when taken further, lead to a condition in which the absolute maximum voltage ratings of the driver and/or boost switch are exceeded. The third approach avoids the potential overvoltage problems of the second approach by using separate windings, one for bootstrap and the other for zero-current detection, at the cost of considerable additional complexity and cost in the boost inductor.

It is therefore apparent that a solution which eliminates the false zero current detection problem without requiring an increase in the boost output voltage, which involves only a single simple electrical component, and which does not sacrifice those benefits which justify use of a PFC driver would constitute a significant improvement over the prior art.

BRIEF DESCRIPTION OF THE DRAWINGS

FIG. 1 shows a prior art power supply circuit which includes a power factor correction driven boost converter.

FIG. 2 shows a power supply circuit which includes a power factor correction driven boost converter with an improved zero current detection circuit, in accordance with the present invention.

DETAILED DESCRIPTION OF A PREFERRED EMBODIMENT

Figure 3:
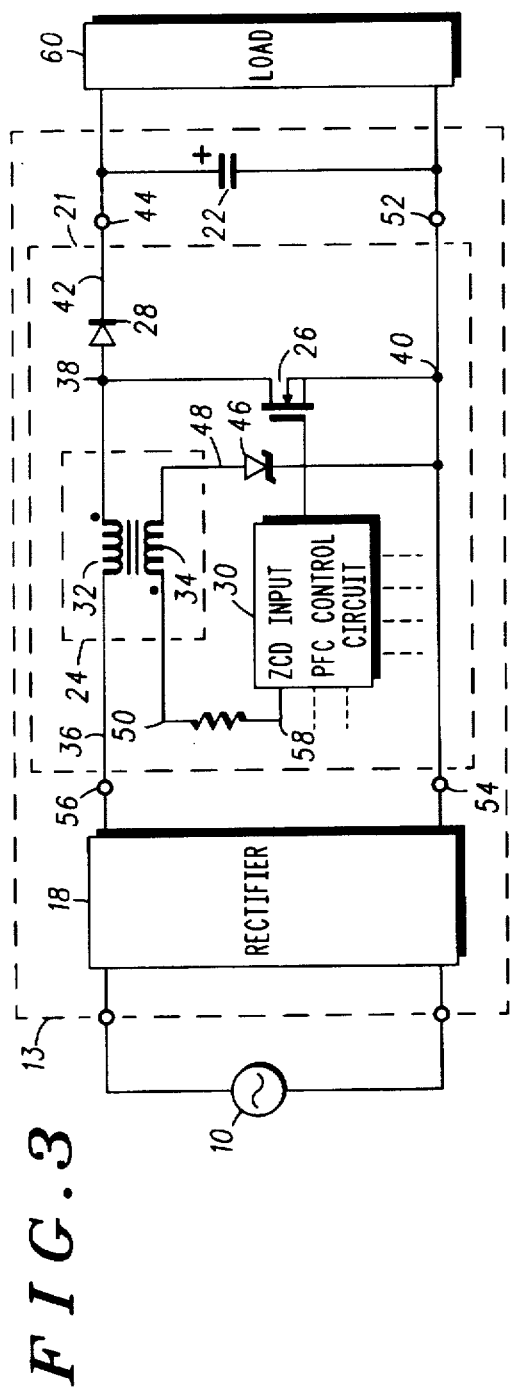
FIG. 3 shows an alternative embodiment of the circuit of FIG. 2, in which the orientation of the zener diode is different, in accordance with the present invention.
Figure 4:
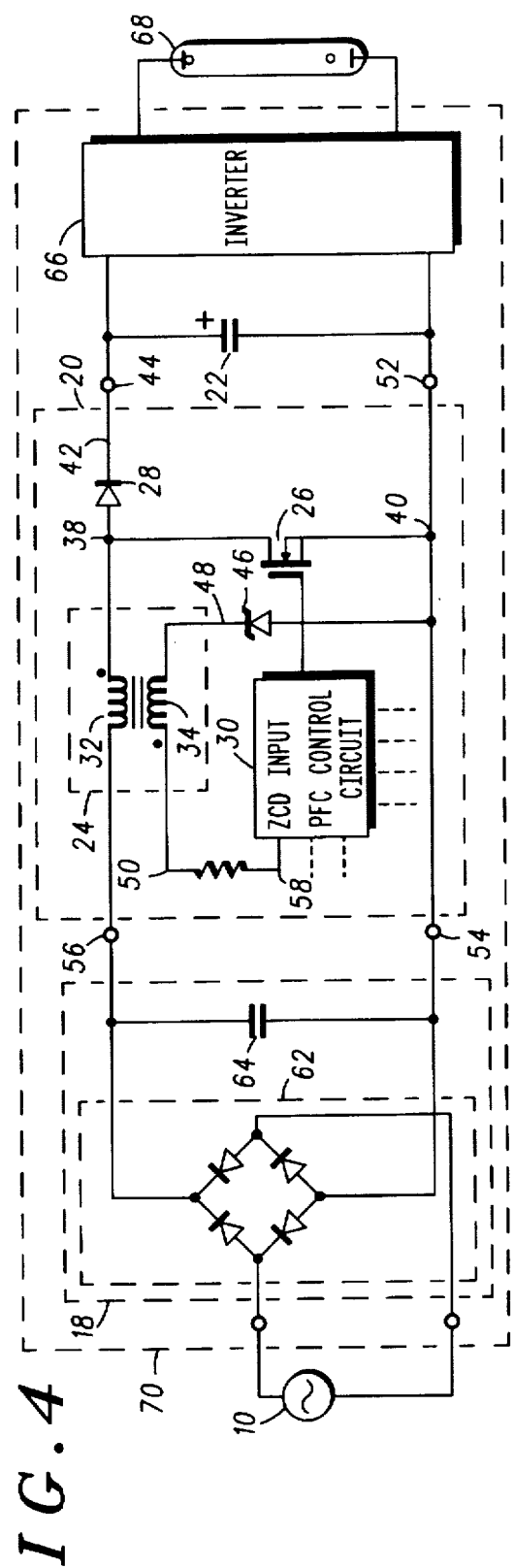
FIG. 4 shows a preferred embodiment of the present invention as applied to an electronic ballast for driving gas discharge lamps, in accordance with the present invention.

An electronic power supply circuit is shown in FIGS. 2, 3, and 4. Referring to FIG. 2, the power supply 12 comprises a rectifying circuit 18, a power factor correction (PFC) driven boost converter 20, and a bulk capacitance 22. The rectifying circuit 18 has a pair of input terminals and a pair of output terminals, the input terminals being adapted to receive a source of alternating current 10. The boost converter 20 has a pair of input terminals which are coupled to the output terminals of the rectifying circuit, and a pair of output terminals, across which is coupled the bulk capacitance 22.

The boost converter 20 comprises a boost transformer 24, a boost switch 26, a boost rectifier 28, and a power factor correction (PFC) control circuit 30 for driving the boost switch 26. The boost transformer 24 includes a primary winding 32 and a secondary winding 34, the primary winding 32 being connected between a first node 36 and a second node 38, the first node 36 being coupled to a first input terminal 56 of the boost converter 20. The boost switch 26 is coupled between the second node 38 and a third node 40, the third node 40 being coupled to a second input terminal 54 and a second output terminal 52 of the boost converter 20. The boost switch 26 has an on state in which a current flows from the second node 38 to the third node 40, and an off state in which no current flows from the second node 38 to the third node 40. The boost rectifier is connected between the second node 38 and a fourth node 42, the fourth node 42 being coupled to a first output terminal 44 of the boost converter 20.

The boost converter 20 further includes a zero current detection (ZCD) circuit, the ZCD circuit including a series circuit comprising the secondary winding 34 of the boost transformer 24 and a zener diode 46 having an anode and a cathode. The zener diode 46 is coupled to the third node 40 and to the secondary winding 34 of the boost transformer 24 at a fifth node 48. The secondary winding 34 of the boost transformer 24 is coupled to a sixth node 50, the sixth node 50 being coupled to a zero current detect (ZCD) input 58 of the PFC control circuit 30. The primary 32 and secondary 34 of the boost transformer 24 are oriented in relation to each other such that a non-negative voltage is present from the fifth node 48 to the sixth node 50 while the boost switch 26 is in the on state.

The zener diode 46 is oriented such that its anode is coupled to the third node 40 and its cathode is connected to the fifth node 48. The boost converter output terminals 44, 52 are adapted to having a load 60 connected across them.

The power supply circuit 12 is capable of operating normally, for a specified input line voltage range, with a boost output voltage which is appreciably lower than that of existing PFC controlled boost converters. Stated differently, for a given boost output voltage, the circuit 12 continues to operate normally at higher input line voltages than existing PFC controlled boost converters.

Referring again to FIG. 2, the steady-state operation of boost converter 20 with regard to zero current detection is explained as follows. When boost switch 26 is on, the current flowing through the primary winding 32 of the boost transformer 24 increases in a linear fashion. All the while, the voltage across the primary 32 is essentially constant. Consequently, a positive current flows through the zener diode 46 from node 48 to node 40, and-the zener diode 46 is thus said to be in the reverse conduction mode. This causes node 48 to be at a positive potential equal to the zener voltage of the zener diode 46, so that the voltage seen by the ZCD input 58 of the PFC control circuit 30 is equal to the sum of the voltage across the boost transformer secondary 34 and the zener voltage. Effectively, the presence of the zener diode 46 provides a positive offset to the voltage provided to the ZCD input 58. This offset remains present for a period of time after the boost switch 26 is turned off. In this way, false zero current detection is minimized or prevented.

After the boost switch 26 is turned off, the current through the primary 32 begins to decrease in a linear fashion and the current through the secondary 34 does the same. The voltage across the zener diode 46 decays very slowly. Eventually, the current through the secondary 34 decreases to a point at which the zener diode 46 begins to fall out of the "avalanche" mode. Accordingly, although the zener diode 46 is still in the reverse conduction mode, the voltage at node 48 begins to decay rapidly. As the voltage across the zener diode 46 approaches zero, the voltage seen by the ZCD input 58 becomes equal to the voltage across the secondary 34.

From this point on, the zener diode 46 no longer affects what is seen by the ZCD input 58. Then, as the current through the primary 32 approaches zero, the boost rectifier 28 becomes reverse biased and the voltages across the primary 32 and secondary 34 reverse in polarity. With the voltage across the secondary 34 now at a negative level, the voltage seen by the ZCD input 58 is below the ZCD threshold, which causes the PFC control circuit 30 to turn the boost switch 26 on again.

It can thus be seen that the presence of zener diode 46 prevents false zero current detection under high input line voltage conditions, but does not prevent the PFC control circuit 30 from detecting when the current through the primary 32 has actually fallen to zero.

An important practical consideration, pertaining to those applications in which the secondary 34 also serves as a bootstrap supply for the PFC control circuit 30, must be observed when connecting the zener diode 46 in the orientation shown in FIG. 2. During a portion of those periods in which the input line voltage is at or near zero and in which the boost switch 26 is off, the voltage at node 50 is at its maximum value (because the secondary voltage is maximized and the zener diode 46 is in the reverse conduction mode). Due to the voltage offset introduced by the zener diode 46, the peak value of the voltage at node 50 will become larger as the zener voltage is increased. As one must be careful not to exceed the predetermined supply voltage limit of the PFC control circuit 30, there is a limit as to how high a zener voltage may be used. As a general rule, in order to maximize the highest input voltage for which the boost converter 20 continues to operate normally, it is advisable to use as high a zener voltage as possible without exceeding the absolute maximum supply voltage of the PFC control circuit 30 and/or the absolute maximum drive voltage of the boost switch 26.

In an alternative embodiment, as shown in FIG. 3, the zener diode 46 is oriented such that its anode is coupled to the fifth node 48 and its cathode is connected to the third node 40. In this case, the presence of zener diode 46 effectively adds an offset of one diode forward voltage drop, which typically amounts to between about 0.3 volts to 0.8 volts, to the voltage seen at the ZCD input 58 of PFC control circuit 30 at the instant that the boost switch 26 is turned off.

In a preferred embodiment, the boost converter 20 is used in connection with an electronic ballast 70 for powering one or more fluorescent lamps is shown in FIG. 4. The rectifier circuit 18 comprises a full-wave diode bridge 62 and a high frequency filter capacitor 64. An inverter 66 adapted to drive one or more fluorescent lamps 68 is coupled to the boost converter output terminals 44,52.

As an example, a ballast substantially equivalent to the circuit shown in FIG. 4 was designed to have a boost output voltage of 456 V and was optimized, with regard to power factor and total harmonic distortion, for an AC input voltage of 277 V. Use of a 3.3 V zener in the zero current detection circuit increased the maximum input voltage for which normal boost operation is maintained from 305 V to 317 V. The presence of the zener diode 46 caused no degradation of the power factor or total harmonic distortion under nominal input voltage (277 V) conditions.

In the absence of the zener diode 46, in order to allow the boost converter 20 to maintain normal operation for an input voltage of 317 V, one would have to either greatly increase the number of turns on the existing secondary 34 and add another secondary to serve as a bootstrap supply for the PFC control circuit 30 or, alternatively, increase the boost output voltage to about 475 V. The first option, by necessitating another winding, greatly adds to the complexity and cost of the boost transformer 24. A consequence of the second alternative is that the inverter components, including the inverter power switches in particular, would then have to be able to tolerate correspondingly higher voltage stresses. Depending upon the particular application, this may dictate the use of power switches with higher voltage ratings and, hence, considerably higher costs.

The PFC control circuit 30 may consist of a single integrated circuit, such as MC33262 manufactured by Motorola, Inc., in which case the zener diode 46 is a discrete component external to the integrated circuit. Alternatively, at least a portion of the PFC control circuit 30 may be made of discrete components. Still another option is to combine the zener diode 46 and at least a portion of the PFC control circuit 30 within a single integrated circuit.

The improved boost converter 20 thus allows for extended operation under high input line voltage conditions at the added cost of only a single passive electrical component, but without degrading the power factor and total harmonic distortion of the converter under nominal line voltage conditions. The circuit 20 is directly applicable to power supplies and electronic ballasts with a PFC controlled boost converter in which, due to voltage limitations imposed by the load or inverter, a low boost output voltage is desirable and in which normal operation under high input voltage conditions is a requirement.

Although the present invention has been described with reference to certain embodiments, numerous modifications and variations can be made by those skilled in the art without departing from the novel spirit and scope of this invention.

What is claimed is:

1. An electronic power supply circuit, comprising:
   a rectifying circuit having a pair of input terminals for receiving a source of alternating current and having a pair of output terminals;
   a boost converter having a pair of input terminals and having a pair of output terminals, the input terminals of the boost converter being coupled to the output terminals of the rectifying circuit, the boost converter comprising:
   a boost transformer having a primary winding and a secondary winding, the primary winding being coupled between a first node and a second node, the first node being coupled to a first input terminal of the boost converter;
   a boost switch coupled between the second node and a third node, the third node being coupled to a second input terminal of the boost converter and a second output terminal of the boost converter, the boost switch having an on state in which a current flows from the second node to the third node, and an off state in which no current flows from the second node to the third node;
   a boost rectifier coupled between the second node and a fourth node, the fourth node being coupled to a first output terminal of the boost converter;
   a power factor correction control circuit for driving the boost switch, the power factor correction control circuit having a zero current detect input and being operable to drive the boost switch into the on state in response to a voltage at the zero current detect input falling below a predetermined zero current detect threshold;
   a zero current detection circuit for providing to the zero current detect input of the power factor correction control circuit a voltage that is representative of the current flowing in the primary winding of the boost transformer when the boost switch is in the off state, the zero current detection circuit comprising the secondary winding of the boost transformer and a zener diode, the zener diode having an anode and a cathode, the zener diode being coupled between the third node and a fifth node, the secondary winding of the boost transformer being coupled between the fifth node and a sixth node, the sixth node being coupled to the zero current detect input of the power factor correction control circuit, the primary and secondary windings of the boost transformer being oriented in relation to each other such that a non-negative voltage is present from the fifth node to the sixth node while the boost switch is in the on state; and a bulk capacitance that is coupled across the output terminals of the boost converter, the bulk capacitance comprising at least one capacitor.

2. The circuit of claim 1, wherein the anode of the zener diode is coupled to the third node and the cathode of the zener diode is coupled to the fifth node.

3. The circuit of claim 2, wherein the zener diode has a zener voltage of about 3 volts.

4. The circuit of claim 1, wherein the anode of the zener diode is coupled to the fifth node and the cathode of the zener diode is coupled to the third node.

5. The circuit of claim 1, wherein the rectifying circuit comprises a full-wave diode bridge.

6. The circuit of claim 1, wherein the output terminals of the boost converter are adapted to receive a load connected across them.

7. The circuit of claim 1, wherein at least a portion of the power factor correction control circuit includes an integrated circuit, the integrated circuit including the zener diode.

8. The circuit of claim 1, wherein at least a portion of the power factor correction control circuit includes an integrated circuit, the zener diode being external to the integrated circuit.

9. An electronic ballast for powering gas discharge lamps, comprising:

a rectifying circuit having a pair of input terminals for receiving a source of alternating current and having a pair of output terminals;

a boost converter having a pair of input terminals and having a pair of output terminals, the input terminals of the boost converter being coupled to the output terminals of the rectifying circuit, the boost converter comprising:

a boost transformer having a primary winding and a secondary winding, the primary winding being coupled between a first node and a second node, the first node being coupled to a first input terminal of the boost converter;

a boost switch coupled between the second node and a third node, the third node being coupled to a second input terminal of the boost converter and a second output terminal of the boost converter, the boost switch having an on state in which a current flows from the second node to the third node, and an off state in which no current flows from the second node to the third node;

a boost rectifier coupled between the second node and a fourth node, the fourth node being coupled to a first output terminal of the boost converter;

a power factor correction control circuit for driving the boost switch, the power factor correction control circuit having a zero current detect input and being operable to drive the boost switch into the on state in response to a voltage at the zero current detect input falling below a predetermined zero current detect threshold;

a zero current detection circuit for providing to the zero current detect input of the power factor correction control circuit a voltage that is representative of the current flowing in the primary winding of the boost transformer when the boost switch is in the off state, the zero current detection circuit comprising the secondary winding of the boost transformer and a zener diode, the zener diode having an anode and a cathode, the zener diode being coupled between the third node and a fifth node, the secondary winding of the boost transformer being coupled between the fifth node and a sixth node, the sixth node being coupled to the zero current detect input of the power factor correction control circuit, the primary and secondary windings of the boost transformer being oriented such that a non-negative voltage is present from the fifth node to the sixth node while the boost switch is in the on state;

a bulk capacitance that is coupled across the output terminals of the boost converter, the bulk capacitance comprising at least one capacitor; and an inverter that is coupled across the output terminals of the boost converter, the inverter being adapted to light at least one fluorescent lamp.

10. The electronic ballast of claim 9, wherein the anode of the zener diode is coupled to the third node and the cathode of the zener diode is coupled to the fifth node.

11. The electronic ballast of claim 10, wherein the zener diode has a zener voltage of about 3 volts.

12. The electronic ballast of claim 9, wherein the anode of the zener diode is coupled to the fifth node and the cathode of the zener diode is coupled to the third node.

13. The electronic ballast of claim 9, wherein the rectifying circuit comprises a full-wave diode bridge.

14. The electronic ballast of claim 9, wherein at least a portion of the power factor correction control circuit includes an integrated circuit, the integrated circuit including the zener diode.

15. The electronic ballast of claim 9, wherein at least a portion of the power factor correction control circuit includes an integrated circuit, the zener diode being external to the integrated circuit.

16. An electronic ballast for powering gas discharge lamps, comprising:

a rectifying circuit having a pair of input terminals for receiving a source of alternating current and having a pair of output terminals, wherein the rectifying circuit comprises a full-wave diode bridge;

a boost converter having a pair of input terminals and having a pair of output terminals, the input terminals of the boost converter being coupled to the output terminals of the rectifying circuit, the boost converter comprising:

a boost transformer having a primary winding and a secondary winding, the primary winding being coupled between a first node and a second node, the first node being coupled to a first input terminal of the boost converter;

a boost switch coupled between the second node and a third node, the third node being coupled to a second input terminal of the boost converter and a second output terminal of the boost converter, the boost switch having an on state in which a current flows from the second node to the third node, and an off state in which no current flows from the second node to the third node;

a boost rectifier coupled between the second node and a fourth node, the fourth node being coupled to a first output terminal of the boost converter;

a power factor correction control circuit for driving the boost switch, the power factor correction control circuit having a zero current detect input and being operable to drive the boost switch into the on state in response to a voltage at the zero current detect input falling below a predetermined zero current detect threshold;

a zero current detection circuit for providing to the zero current detect input of the power factor correction control circuit a voltage that is representative of the current flowing in the primary winding of the boost transformer when the boost switch is in the off state, the zero current detection circuit comprising the secondary winding of the boost transformer and a zener diode, the zener diode having an anode and a cathode, the cathode of the zener diode being coupled to the secondary winding of the boost transformer at a fifth node, the anode of the zener diode being coupled to the third node, the secondary winding of the boost transformer being coupled to a sixth node, the sixth node being coupled to the zero current detect input of the power factor correction control circuit, the primary and secondary windings of the boost transformer being oriented in relation to each other such that a non-negative voltage is present from the fifth node to the sixth node while the boost switch is in the on state;

a bulk capacitance that is coupled across the output terminals of the boost converter, the bulk capacitance comprising at least one capacitor; and an inverter that is coupled across the output terminals of the boost converter, the inverter being adapted to light at least one fluorescent lamp.

17. The electronic ballast of claim 16, wherein the zener diode has a zener voltage of about 3 volts.

18. The electronic ballast of claim 16, wherein at least a portion of the power factor correction control circuit includes an integrated circuit, the integrated circuit including the zener diode.

19. The electronic ballast of claim 16, wherein at least a portion of the power factor correction control circuit includes an integrated circuit, the zener diode being external to the integrated circuit.

* * * * *